US008222307B2

(12) United States Patent
Allmendinger et al.

(10) Patent No.: US 8,222,307 B2
(45) Date of Patent: Jul. 17, 2012

(54) FLAMEPROOF EXPANDABLE STYRENE POLYMERS, AND METHOD FOR THE PRODUCTION THEREOF

(75) Inventors: Markus Allmendinger, Edenkoben (DE); Bernhard Schmied, Frankenthal (DE); Joachim Ruch, Wachenheim (DE); Konrad Knoll, Mannheim (DE); Michael Riethues, Ludwigshafen (DE); Klaus Hahn, Kirchheim (DE); Carsten Schips, Speyer (DE); Jessica Rylander, Karlskoga (SE)

(73) Assignee: BASF SE, Ludwigshafen (DE)

( * ) Notice: Subject to any disclaimer, the term of this patent is extended or adjusted under 35 U.S.C. 154(b) by 138 days.

(21) Appl. No.: 12/743,755

(22) PCT Filed: Nov. 20, 2008

(86) PCT No.: PCT/EP2008/065879
§ 371 (c)(1),
(2), (4) Date: May 19, 2010

(87) PCT Pub. No.: WO2009/065880
PCT Pub. Date: May 28, 2009

(65) Prior Publication Data
US 2010/0273925 A1    Oct. 28, 2010

(30) Foreign Application Priority Data
Nov. 21, 2007  (EP) .................................. 07121211

(51) Int. Cl.
C08J 9/16    (2006.01)
C08J 9/14    (2006.01)
C08F 290/06  (2006.01)
C08K 5/02    (2006.01)

(52) U.S. Cl. ............. 521/60; 264/13; 521/79; 521/146; 524/81; 524/464

(58) Field of Classification Search .................. 521/60, 521/79, 146; 264/13; 524/81, 464
See application file for complete search history.

(56) References Cited

U.S. PATENT DOCUMENTS

| 6,340,713 B1 | 1/2002 | Gluck et al. | |
| 6,569,912 B1 * | 5/2003 | Oohara et al. | 521/79 |
| 2007/0238794 A1 * | 10/2007 | Hahn et al. | 521/80 |

FOREIGN PATENT DOCUMENTS

| EP | 0981574 B1 | 3/2000 |
| EP | 1164158 A1 | 12/2001 |
| EP | 1408073 A1 | 4/2004 |
| WO | WO-97/45477 A1 | 12/1997 |
| WO | WO-98/51735 A1 | 11/1998 |
| WO | WO-03/046016 A1 | 6/2003 |
| WO | WO-2006/007995 A2 | 1/2006 |
| WO | WO-2006/007996 A1 | 1/2006 |

OTHER PUBLICATIONS

International Search Report for PCT/EP2008/065879.*
Notification of Transmittal of Translation fo the international Preliminary Report on Patentability and Written Opinion issued in related international Application No. PCT/EP2008/065879 (English and Non-English copies attached) issued Jun. 1, 2010.

* cited by examiner

*Primary Examiner* — Timothy J. Kugel
(74) *Attorney, Agent, or Firm* — Connolly Bove Lodge & Hutz LLP

(57) ABSTRACT

Expandable styrene polymers (EPS) comprising, in each case based on the styrene polymer,
a) from 0.05 to 5% by weight of an organic bromine compound whose bromine content is at least 50% by weight, as flame retardant,
b) from 0.05 to 2% by weight of a flame retardant synergist,
c) from 0.1 to 5% by weight of a metal salt as acid scavenger, and process for their production.

16 Claims, No Drawings

FLAMEPROOF EXPANDABLE STYRENE POLYMERS, AND METHOD FOR THE PRODUCTION THEREOF

CROSS REFERENCE TO RELATED APPLICATIONS

This application is a national stage application under 35 U.S.C. §371 of PCT/EP2008/065879, filed Nov. 20, 2008, which claims benefit to European application 07121211.2, filed Nov. 21, 2007, the entire disclosures of which are hereby incorporated by reference.

The invention relates to expandable styrene polymers (EPS) comprising, in each case based on the styrene polymer,
a) from 0.05 to 5% by weight of an organic bromine compound whose bromine content is at least 50% by weight, as flame retardant,
b) from 0.05 to 2% by weight of a flame retardant synergist,
c) from 1 to 5% by weight of a metal salt as acid scavenger, and process for their production.

Processes for the production of flame-retardant, expandable styrene polymers via extrusion of a styrene polymer melt comprising blowing agent are known by way of example from EP-A 0 981 574, WO 97/45477, or WO 03/46016. The flame retardant here is melted with polystyrene, if appropriate together with further additives, and a blowing agent is then added.

The flame retardant synergists used for halogenated flame retardants, such as hexabromocyclododecane (HBCD), are generally thermal free-radical generators, e.g. dicumyl peroxide or dicumyl.

The residence time and local, shear-induced temperature peaks in the extrusion process increase the thermal stress to which the heat-sensitive additives, such as flame retardants and peroxides, are exposed. The additives can be degraded here, and the amount providing effective action in the product can be reduced. If flame retardants such as HBCD are used, highly corrosive hydrobromic acid can be produced. The decomposition of peroxides, which is further accelerated by acids, can bring about severe molecular-weight degradation of the styrene polymer melt. Expandable styrene polymers having excessively low molecular weights exhibit high shrinkage during processing and poorer mechanical properties in the foamed polymer.

WO 2006/007995 describes a process for the production of flame-retardant, expandable polystyrene in which the residence time of the flame retardant is less than 30 minutes at a melt temperature in the range from 140 to 220°.

The process of WO 2006/07996 uses a pump in a simple method of feeding the flame retardant synergists in the form of liquids or in solution under non-aggressive conditions into the main stream of a styrene polymer melt comprising blowing agent. A further proposal premixes the flame retardant with a proportion of styrene polymer melt and feeds this by way of an ancillary extruder. Although this markedly shortens the time for which the flame retardants are exposed to thermal stress, thermal degradation of the flame retardant can even occur during premixing of the flame retardant in the styrene polymer melt. This step of the process moreover increases costs.

It was therefore an object of the present invention to eliminate the disadvantages described and to provide expandable styrene polymers which can be processed to give styrene polymer foams with very good flame-retardant properties, and to provide a process for their production via melt extrusion with little molecular-weight degradation of the styrene polymer melt.

The abovementioned expandable styrene polymers have accordingly been found.

The ratio by weight of flame retardant synergist to organic bromine compound is preferably in the range from 1 to 20.

The flame retardant used comprises an organic bromine compound whose bromine content is at least 50% by weight. Particularly suitable compounds are aliphatic, cycloaliphatic, and aromatic bromine compounds, such as hexabromocyclododecane, pentabromomonochlorocyclohexane, pentabromophenyl allyl ether. The flame retardant used preferably comprises hexabromocyclododecane (HBCD) or tetrabromobisphenol A bis(allyl ether):

The amounts generally used of the flame retardant are from 0.05 to 5% by weight, preferably from 0.5 to 2.5% by weight, based on the styrene polymer.

Suitable flame retardant synergists are thermal free-radical generators whose half-life times are 6 minutes at temperatures in the range from 110 to 300° C., preferably from 140 to 230° C. It is particularly preferable to use dicumyl, dicumyl peroxide, cumyl hydroperoxide, di-tert-butyl peroxide, tert-butyl hydroperoxide, or a mixture thereof. The amounts generally used of the flame retardant synergist are in the range from 0.05 to 2% by weight, preferably in the range from 0.1 to 0.5% by weight, based on the styrene polymer.

The flame retardant synergist is preferably used undiluted or, in the case of solids, in solution which is almost saturated under standard conditions (1 bar, 23° C.), so that the synergist can be fed by traditional pump systems directly into a temperature-controlled and pressurized space. Presence of the material in the liquid phase permits metering in such a way that the amounts that withstand the processing conditions and, respectively, extrusion conditions are sufficient, even in the case of peroxides with low decomposition value, and homogeneous incorporation by mixing is still achieved. It is preferable that dicumyl peroxide is used in the form of a melt at a temperature in the range from 35 to 50° C. or in the form of a solution in pentane or octane.

The organic bromine compounds used as flame retardants decompose in the temperature range from 150 to 280° Celsius, and the product here can be bromine, hydrobromic acid, or free bromine radicals. According to the invention, therefore, a metal salt is used as acid scavenger. The expandable styrene polymers preferably comprise a metal oxide or metal hydroxide of magnesium, of aluminum, or of zinc, or an alkali metal carbonate or alkali metal hydrogen carbonate, as acid scavenger.

The inventive, expandable styrene polymers comprise from 0.1 to 5% by weight, preferably from 0.3 to 1% by weight, based on the styrene polymer, of the acid scavenger.

A suitable process for the production of the inventive expandable styrene polymers (EPS) comprises the extrusion of a styrene polymer melt comprising blowing agent and comprising flame retardant through a die plate with attached underwater pelletizer, which comprises incorporation by mixing of a blowing agent and of, in each case based on the styrene polymer,
a) from 0.05 to 5% by weight of an organic bromine compound whose bromine content is at least 70% by weight, as flame retardant,
b) from 0.05 to 2% by weight of a flame retardant synergist and
c) from 0.1 to 5% by weight of a metal salt as acid scavenger, into the styrene polymer melt.

Melts that can be used for the polymer melt are generally those of thermoplastic polymers. It is preferable to use noncrystalline polymers whose glass transition temperature is in the range from 70 to 120° C., particularly preferably styrene polymers.

It has been found that styrene polymers whose molecular weights Mw are below 170 000 cause polymer abrasion during pelletization. The molar mass of the expandable styrene polymer is preferably in the range from 190 000 to 400 000 g/mol, particularly preferably in the range from 220 000 to 300 000 g/mol. The molar mass of the expandable styrene polymer is generally below the molar mass of the styrene polymer used by about 10 000 g/mol, as a result of molar-mass degradation through shear and/or exposure to heat. The molecular weight can be determined by means of gel permeation chromatography with respect to polystyrene as standard.

In order to minimize the size of the pellets obtained, die swell should be minimized. It has been found that die swell can be influenced inter alia via the molecular-weight distribution for styrene polymer. The polydispersity of the molecular-weight distribution $M_w/M_n$ of the expandable styrene polymer should therefore preferably be at most 3.5, particularly preferably in the range from 1.5 to 3, and very particularly preferably in the range from 1.8 to 2.6.

The styrene polymers used preferably comprise glass-clear polystyrene (GPPS), impact-resistant polystyrene (HIPS), anionically polymerized polystyrene or impact-resistant polystyrene (A-IPS), styrene-α-methylstyrene copolymers, acrylonitrile-butadiene-styrene polymers (ABS), styrene-acrylonitrile (SAN), acrylonitrile-styrene-acrylate (ASA), methacrylate-butadiene-styrene (MBS), methyl methacrylate-acrylonitrile-butadiene-styrene (MABS) polymers, or a mixture thereof or with polyphenylene ether (PPE).

In order to improve mechanical properties or thermal stability, the styrene polymers mentioned may be blended with thermoplastic polymers, such as polyamides (PAs), polyolefins, such as polypropylene (PP) or polyethylene (PE), polyacrylates, such as polymethyl methacrylate (PMMA), polycarbonate (PC), polyesters, such as polyethylene terephthalate (PET) or polybutylene terephthalate (PBT), polyether sulfones (PES), polyether ketones or polyether sulfides (PES) or mixtures of these, generally in total proportions up to a maximum of 30% by weight, preferably in the range from 1 to 10% by weight, based on the polymer melt, where appropriate with use of compatibilizers. Mixtures within the ranges of amounts mentioned are also possible with, by way of example, hydrophobically modified or functionalized polymers or oligomers, rubbers, such as polyacrylates or polydienes, e.g. styrene-butadiene block copolymers, or biodegradable aliphatic or aliphatic/aromatic copolyesters.

Examples of suitable compatibilizers are maleic-anhydride-modified styrene copolymers, polymers containing epoxy groups, and organosilanes.

To improve processability of the expandable styrene polymers, in particular to reduce shrinkage during prefoaming, the styrene polymers can be blended with from 0.1 to 20% by weight of polyphenylene ether (PPE).

The properties of the expandable styrene polymers can moreover be improved, in particular if the molecular weights of the styrene polymer are too low, via addition of from 0.1 to 20% by weight of a high-molecular-weight or branched polystyrene and, respectively, by molecular-weight increase in the extruder or static mixer via addition of polyfunctional branching agents or peroxides.

The elasticity of the foams obtainable from the expandable styrene polymers can be improved via blending with from 5 to 40% by weight of styrene-polybutadiene block copolymers.

The styrene polymer melt can also receive additions of recycled polymer materials derived from the thermoplastic polymers mentioned, in particular additions of styrene polymers and of expandable styrene polymers (EPS), in amounts which do not substantially impair their properties, the amounts generally being at most 50% by weight, in particular from 1 to 20% by weight.

The styrene polymer melt comprising blowing agent generally comprises one or more blowing agents homogeneously distributed in a total proportion of from 2 to 10% by weight, preferably from 3 to 7% by weight, based on the styrene polymer melt comprising blowing agent. Suitable blowing agents are the physical blowing agents usually used in EPS, such as aliphatic hydrocarbons having from 2 to 7 carbon atoms, alcohols, ketones, ethers, or halogenated hydrocarbons. Preference is given to use of isobutane, n-butane, isopentane, n-pentane.

To improve foamability, finely dispersed droplets of internal water may be introduced into the styrene polymer matrix. An example of the method for this is the addition of water into the molten styrene polymer matrix. The location of addition of the water may be upstream of, together with, or downstream of, the blowing agent feed. Homogeneous distribution of the water may be achieved by using dynamic or static mixer's.

An adequate amount of water, based on the styrene polymer, is generally from 0 to 2% by weight, preferably from 0.05 to 1.5% by weight.

Expandable styrene polymers (EPSs) with at least 90% of the internal water in the form of droplets of internal water with diameter in the range from 0.5 to 15 μm form, on foaming, foams with an adequate number of cells and with homogeneous foam structure.

The amount added of blowing agent and of water is selected in such a way that the expansion capability α of the expandable styrene polymers (EPSs), defined as bulk density prior to foaming/bulk density after foaming, is at most 125, preferably from 25 to 100.

The bulk density of the expandable styrene polymer pellets (EPSs) is generally at most 700 g/l, preferably in the range from 590 to 660 g/l. If fillers are used, bulk densities in the range from 590 to 1200 g/l may arise, depending on the nature and amount of the filler.

It is particularly preferable that the flame retardant and, if appropriate, further heat-sensitive additives is/are dispersed by way of a side stream extruder or in the form of a suspension, and fed into the main stream of the styrene polymer melt comprising blowing agent, and that the materials are extruded together through a die plate with attached underwater pelletizer. The flame retardant synergist is preferably fed directly into the main stream by way of a pump and feed probe at the same position or downstream.

The residence time of the flame retardant and of the flame retardant synergist here can be kept below 10 minutes at a melt temperature in the range from 140 to 220° C., preferably in the range from 170 to 200° C.

Surprisingly, a rotary gate piston pump (Orlita) can be used to convey highly concentrated suspensions continuously into a pressurized space, for example a static mixer. The solids content of the suspension is preferably in the range from 60 to 95% by weight, particularly preferably in the range from 70 to 80% by weight. The D50 value for the particle size of the suspended solids determined by light scattering is preferably in the range from 1 to 100 μm.

To reduce viscosity, further additional components can be added to the suspension, examples being polyethylene waxes, blowing agents or blowing agent constituents, styrene, or ethylbenzene.

The viscosity of the suspension is from 10 to 1000 mPas at a temperature in the range from 20 to 180°, preferably in the range from 30 to 140° C. The suspension is preferably introduced at room temperature into the polymer melt, but can also, as a function of viscosity, be introduced at higher temperatures. The suspension can undergo conversion into a solution on heating to temperatures in the range from 140 to 180° C. By way of example, this occurs in the case of hexabromocyclododecane (HBCD) in oligomeric styrene polymers as suspension medium.

The suspension medium used preferably comprises aliphatic hydrocarbons or aliphatic hydrocarbon mixtures, examples being mineral oils, medicinal white oil, pentanes, or octanes. Other suitable suspension media are oligomeric polymers whose molar masses are in the range from 500 to 5000 g/mol, in particular oligomeric styrene polymers. The oligomeric polymers generally have less plasticizing effect on the polymer matrix.

The inventive process is particularly suitable for the feeding of heat-sensitive solid particles under non-aggressive conditions. It is preferable here to use hexabromocyclododecane (HBCD) whose D50 value is less than 80 μm.

It is also possible, if appropriate, to introduce further additives by way of the suspension, examples being nucleating agents, acid scavengers for decomposition products of the flame retardants, e.g. aluminum hydroxides or magnesium hydroxides, carbon black or graphite, flame retardant synergists, such as peroxides, or plasticizers.

By way of example, the suspension can be prepared continuously by means of an intensive mixer. The solid particles become finely dispersed in the suspension medium. In order to ensure low viscosities and homogeneous dispersion of the solid particles in the suspension, the supply line can comprise additional mixing units and can be heated.

Introduction of the flame retardant in the form of a suspension permits incorporation of heat-sensitive additives, in particular flame retardants, homogeneously into a polymer melt under non-aggressive conditions. This can reduce the amount used of the heat-sensitive additives and, respectively, increase the effective amount in the product. When flame retardants are incorporated under non-aggressive conditions, it is not essential to use flame retardant synergists to obtain sufficient flame retardancy.

Another method for incorporation of heat- and/or shear-sensitive additives, such as the flame retardants HBCD or expandable graphite, into the high-viscosity styrene polymer melt under non-aggressive conditions is provided by a planetary-gear extruder as side stream extruder. The temperature peaks arising here are less pronounced, and a temperature-controlled screw and a temperature-controlled barrel can be used to dissipate the energy from the planetary-gear extruder. The continuous kneading and drawing processes in the planetary-gear extruder permit effective dispersion of the additives even when no compatibilizers are added.

Additives, nucleating agents, fillers, plasticizers, soluble and insoluble inorganic and/or organic dyes and pigments, e.g. IR absorbers, such as carbon black, natural and synthetic graphites, for example graphitized acetylene coke or aluminum powder may moreover be added, together or with spatial separation, to the styrene polymer melt, e.g. by way of mixers or ancillary extruders. The amounts added of the dyes and pigments are generally in the range from 0.01 to 30% by weight, preferably in the range from 1 to 5% by weight. For homogeneous and microdisperse distribution of the pigments within the styrene polymer, it can be advantageous, particularly in the case of polar pigments, to use a dispersing agent, e.g. organosilanes, polymers containing epoxy groups, or maleic-anhydride-grafted styrene polymers. Preferred plasticizers are mineral oils, phthalates, which may be used in amounts of from 0.05 to 10% by weight, based on the styrene polymer.

Planetary-gear extruders are likewise suitable for the incorporation of pigments and of IR absorbers. The addition of grinding aids, such as chalk or kaolin, can in particular be used to communite graphite to the desired particle size in the range from 1 to 20 μm.

When foams composed of expandable styrene polymers are used as electrically insulating materials, their surface resistance is about $10^{13}$ ohms. The surface resistance can be reduced to from $10^8$ to $10^{10}$, in particular from $10^6$ to $10^8$, ohms by addition into the styrene polymer melt of from 1 to 20% by weight, particularly of 5 to 15% by weight, of conductive carbon black or of exfoliated graphite. The resultant expandable styrene polymers have good processability and exhibit no static charging in particular when they are conveyed, or charged to containers, or metered. The foams produced therefrom have excellent suitability for the packaging of electronic components.

To prepare the expandable styrene polymers, the blowing agent is mixed into the polymer melt. The process comprises the stages a) melt production, b) mixing c) cooling d) transport, and e) pelletizing. Each of these stages may be executed using the apparatus or combinations of apparatus known from plastics processing. Static or dynamic mixers, such as extruders, are suitable for this mixing process. The polymer melt may be taken directly from a polymerization reactor, or produced directly in the mixing extruder, or in a separate melting extruder via melting of polymer pellets. The cooling of the melt may take place in the mixing assemblies or in separate coolers. Examples of pelletizers which may be used are pressurized underwater pelletizers, the pelletizer with rotating knives and cooling via spray-misting of temperature-control liquids, or pelletizers involving atomization. Examples of suitable arrangements of apparatus for carrying out the process are:
a) polymerization reactor-static mixer/cooler-pelletizer
b) polymerization reactor-extruder-pelletizer
c) extruder-static mixer-pelletizer
d) extruder-pelletizer The arrangement may also have ancillary extruders for introducing additives, e.g. solids or heat-sensitive additives.

The temperature of the styrene polymer melt comprising blowing agent when it is passed through the die plate is generally in the range from 140 to 300° C., preferably in the range from 160 to 240° C. Cooling to the region of the glass transition temperature is not necessary.

The die plate is heated at least to the temperature of the styrene polymer melt comprising blowing agent. The temperature of the die plate is preferably above the temperature of the styrene polymer melt comprising blowing agent by from 20 to 100° C. This avoids polymer deposits in the dies and ensures problem-free pelletization.

In order to obtain marketable pellet sizes, the diameter (D) of the die holes at the discharge from the die should be in the range from 0.2 to 1.5 mm, preferably in the range from 0.3 to 1.2 mm, particularly preferably in the range from 0.3 to 0.8 mm. Even after die swell, this permits controlled setting of pellet sizes below 2 mm, in particular in the range from 0.4 to 1.4 mm.

Die swell can be affected not only by the molecular weight distribution but also by the geometry of the die. The die plate preferably has holes with an L/D ratio of at least 2, where the length (L) indicates that region of the die whose diameter is at most the diameter (D) at the discharge from the die. The L/D ratio is preferably in the range from 3 to 20.

The diameter (E) of the holes at the entry to the die in the die plate should generally be at least twice as large as the diameter (D) at the discharge from the die.

One embodiment of the die plate has holes with conical inlet and an inlet angle α smaller than 180°, preferably in the range from 30 to 120°. In another embodiment, the die plate has holes with a conical outlet and an outlet angle β smaller than 90°, preferably in the range from 15 to 45°. In order to produce controlled pellet size distributions in the styrene polymers, the die plate may be equipped with holes of different discharge diameter (D). The various embodiments of die geometry may also be combined with one another.

One particularly preferred process for preparing the inventive expandable styrene polymers comprises the steps of a) polymerization of styrene monomer and, where appropriate, of copolymerizable monomers to give a styrene polymer whose average molar mass is in the range from 160 000 to 400 000 g/mol, preferably in the range from 220 000 to 330 000 g/mol, b) devolatilization of the resultant styrene polymer melt, c) incorporating by means of a static or dynamic mixer at a temperature of at least 150° C., preferably from 180 to 260° C., the blowing agent, flame retardant synergist, acid scavenger, and, where appropriate, further additives into the styrene polymer melt, d) cooling the styrene polymer melt comprising blowing agent to a temperature of at least 120° C., preferably from 150 to 200° C., e) introduction of the flame retardant in the form of a suspension by means of a rotary gate piston pump into the pressurized polymer melt, f) discharge through a die plate with holes whose diameter at the discharge from the die is at most 1.5 mm, and g) pelletizing the melt comprising blowing agent.

The pelletizing process in step g) may take place directly downstream of the die plate under water at a pressure in the range from 1 to 25 bar, preferably from 5 to 15 bar.

Because of the polymerization in stage a) and devolatilization in stage b), a polymer melt is directly available for blowing agent impregnation in stage d) and no melting of styrene polymers is necessary. This is not only more cost-effective, but also gives expandable styrene polymers (EPSs) with low styrene monomer contents, because it avoids exposure to mechanical shear in the homogenizing section of an extruder—exposure which generally leads to breakdown of polymers to give monomers. In order to keep the styrene monomer content low, in particular below 500 ppm, it is also advantageous to minimize the amount of mechanical and thermal energy introduced in all of the subsequent stages of the process. Particular preference is therefore given to maintaining shear rates below 50/sec, preferably from 5 to 30/sec, and temperatures below 260° C., and also to short residence times in the range from 1 to 20 minutes, preferably from 2 to 10 minutes, in stages d) to f). It is particularly preferable to use exclusively static mixers and static coolers in the entire process. The polymer melt may be transported and discharged via pressure pumps, e.g. gear pumps.

Another method of reducing styrene monomer content and/or residual solvent, such as ethylbenzene, consists in providing a high level of devolatilization in stage b), using entrainers, such as water, nitrogen or carbon dioxide, or carrying out the polymerization stage a) by an anionic route. Anionic polymerization of styrene not only gives styrene polymers with low styrene monomer content but also gives low styrene oligomer contents.

To improve processability, the finished expandable styrene polymer pellets may be coated by glycerol esters, antistatic agents, or anticaking agents.

The EPS pellets can be coated with glycerol, monostearate GMS (typically 0.25%), glycerol tristearate (typically 0.25%), Aerosil R972 fine-particle silica (typically 0.12%), and Zn stearate (typically 0.15%), and also antistatic agent.

The expandable styrene polymer pellets can, in a first step, be prefoamed by means of hot air or steam to give foam beads whose density is in the range from 8 to 100 g/l, and, in a second step, can be fused in a closed mold to give molded foams.

Inventive use of the metal salt as acid scavenger reduces the molecular-weight degradation of the styrene polymer and improves the flame-retardant properties of the styrene polymer foam for comparable amounts of flame retardant and flame retardant synergist used.

EXAMPLES

All amounts stated are proportions by weight and are based on the entire amount of polymer (main stream and ancillary stream).

Starting Materials:

PS158 K (polystyrene from BASF AG with viscosity number VN of 98 ml/g, with average molar mass $M_w$ of 280 000 g/mol, and with polydispersity $M_w/M_n$ of 2.8)

PS168 N (polystyrene from BASF AG with viscosity number VN of 115 ml/g, with average molar mass $M_w$ of 310 000 g/mol and with polydispersity $M_w/M_n$ of 2.5)

HBCD: FR-1206 Hat hexabromocyclododecane from Eurobrom (flame retardant) in the form of a 70% strength by weight suspension in white oil.

Flame Retardant Synergists:

Perkadox® 30

50% strength by weight solution of dicumyl peroxide in pentane

Inventive Example 1

6.0% by weight of pentane and 3.6% by weight of graphite (Superior 85/95) were incorporated by mixing into a polystyrene melt composed of PS 158 K from BASF Aktiengesellschaft. After cooling of the melt comprising blowing agent from initially 260° C. to a temperature of 180° C., a mixture composed of polystyrene melt, HBCD (1.5% by weight), aluminum hydroxide (0.5% by weight), and Luwax AH3 (0.2% by weight) was added by way of a side stream extruder and incorporated by mixing into the main stream. 0.4% by weight of dicumyl peroxide dissolved in pentane (50:50) was also introduced as flame retardant synergist to the cooled main stream downstream by way of a feed probe in combination with a piston pump.

The mixture composed of polystyrene melt, graphite, blowing agent, flame retardant, and flame retardant synergist was conveyed at 60 kg/h through a die plate with 32 holes (diameter of die: 0.75 mm). Compact pellets with narrow size distribution were produced with the aid of a pressurized underwater pelletizer (10 bar).

The resultant expandable polystyrene pellets were prefoamed in a current of steam to give foam beads whose density was about 20 g/l, and after storage for 24 hours were fused in gas-tight molds, using steam, to give foam products.

The surface resistance of the foam was $10^{13}$ ohms (electrical conductivity measured to ISO 3915).

Inventive Example 2

Inventive example 1 was repeated except that 2% by weight of aluminum hydroxide were fed by way of the side stream and 0.6% by weight of dicumyl peroxide was fed by way of the feed probe.

Inventive Example 3

Inventive example 1 was repeated except that 0.4% by weight of dicumyl peroxide in the form of melt was introduced by way of the feed probe into the cooled main stream.

Inventive Example 4

Inventive example 1 was repeated except that, instead of HBCD, 1.5% by weight of tetrabromobisphenol A bis(allyl ether) (Great Lakes BE 51®, Chemtura) was introduced by way of the side stream.

Inventive Example 5

Inventive example 1 was repeated except that a planetary-gear extruder was used for the feed by way of the side stream.

Comparative Example Comp 1

Inventive example 1 was repeated except that, instead of aluminum hydroxide, 2% by weight of chalk (Ulmer Weiss XL) were added by way of the side stream.

Table 1 collates the viscosity number VN and the fire-protection test results, measured in the molded EPS foam. Products whose afterflame times are 6 seconds or less pass the B1 and B2 test according to the German construction industry standard (DIN 4102).

TABLE 1

| Example | VN | Afterflame time [sec.] |
|---|---|---|
| 1 | 83 | 5 |
| 2 | 81 | 4 |
| 3 | 82 | 3 |
| 4 | 82 | 6 |
| 5 | 83 | 2.5 |
| comp 1 | 70 | 10 |

Inventive Example 6

Inventive example 1 was repeated except that the polymer melt in the main stream and ancillary stream comprised 90% by weight of polystyrene 158 K and 10% by weight of polystyrene 168 N.

Inventive Example 7

Inventive example 1 was repeated except that the polymer melt in the main stream and ancillary stream comprised 98% by weight of polystyrene 158 K and 2% by weight of an ultrahigh-molecular-weight polystyrene (Mw=800 000 g/mol, polydispersity $M_w/M_n$=3).

Inventive Example 8

Inventive example 1 was repeated except that the polymer melt in the main stream and ancillary stream comprised 98% by weight of polystyrene 158 K and 10% by weight of polyphenylene ether PPE (Noryl 8890 C from GE).

Inventive Example 9

Inventive example 1 was repeated except that the polymer melt in the main stream and ancillary stream comprised 87.5% by weight of polystyrene 158 K, 8% by weight of polyphenylene ether PPE (Noryl EF from GE) and 4.5% by weight of an elastomeric styrene-butadiene block copolymer (Styroflex® 2G55). Table 2 collates the foaming behavior. Premature shrinkage was avoided.

TABLE 2

| | Foaming time [sec] | | | | | | |
|---|---|---|---|---|---|---|---|
| | 2 | 3 | 4 | 5 | 6 | 7 | 8 |
| Bulk density [g/l] | 29.4 | 27.8 | 26.3 | 25.0 | 25.0 | 26.3 | 27.8 |

Inventive Example 10

Inventive example 1 was repeated except that the main stream comprised polystyrene 158 K, 6% by weight of pentane, 3.6% by weight of graphite UF 298 from Kropfmühl AG and 10% by weight of conductive carbon black. The surface resistance of the foam produced therefrom was $10^6$ ohms (electrical conductivity measured to ISO 3915).

Inventive Example 11

Inventive example 10 was repeated except that the material comprised, instead of the conductive carbon black, 10% by weight of exfoliated graphite (produced via expansion of expandable graphite and subsequent grinding). The surface resistance of the foam produced therefrom was $10^7$ ohms (electrical conductivity measured to ISO 3915).

The invention claimed is:
1. An expandable styrene polymer comprising, in each case based on the styrene polymer,
   a) from 0.05 to 5% by weight of an organic bromine compound whose bromine content is at least 50% by weight, as a flame retardant,
   b) from 0.05 to 2% by weight of a flame retardant synergist,
   c) from 0.1 to 5% by weight of a metal oxide or metal hydroxide of magnesium, of aluminum, or of zinc, or an alkali metal carbonate or alkali metal hydrogen carbonate, as an acid scavenger.
2. The expandable styrene polymer according to claim 1, wherein the ratio by weight of flame retardant synergist to organic bromine compound is in the range from 1 to 20.
3. The expandable styrene polymer according to claim 2, wherein the flame retardant is hexabromocyclododecane.
4. The expandable styrene polymer according to claim 3, wherein the flame retardant synergist is selected from the group consisting of dicumyl, dicumyl peroxide, cumyl hydroperoxide, di-tert-butyl peroxide, tert-butyl hydroperoxide, and mixtures thereof.
5. The expandable styrene polymer according to claim 2, wherein the flame retardant synergist is selected from the group consisting of dicumyl, dicumyl peroxide, cumyl hydroperoxide, di-tert-butyl peroxide, tert-butyl hydroperoxide, and mixtures thereof.

6. The expandable styrene polymer according to claim 5, which comprises from 1 to 10% by weight of pentane as a blowing agent.

7. The expandable styrene polymer according to claim 2, which comprises from 1 to 10% by weight of pentane as a blowing agent.

8. The expandable styrene polymer according to claim 1, wherein the flame retardant is hexabromocyclododecane.

9. The expandable styrene polymer according to claim 8, wherein the flame retardant synergist is selected from the group consisting of dicumyl, dicumyl peroxide, cumyl hydroperoxide, di-tert-butyl peroxide, tert-butyl hydroperoxide, and mixtures thereof.

10. The expandable styrene polymer according to claim 9, which comprises from 1 to 10% by weight of pentane as a blowing agent.

11. The expandable styrene polymer according to claim 8, which comprises from 1 to 10% by weight of pentane as a blowing agent.

12. The expandable styrene polymer according to claim 1, wherein the flame retardant synergist is selected from the group consisting of dicumyl, dicumyl peroxide, cumyl hydroperoxide, di-tert-butyl peroxide, tert-butyl hydroperoxide, and mixtures thereof.

13. The expandable styrene polymer according to claim 12, which comprises from 1 to 10% by weight of pentane as a blowing agent.

14. The expandable styrene polymer according to claim 1, which comprises from 1 to 10% by weight of pentane as a blowing agent.

15. The expandable styrene polymer according to claim 14, which comprises from 3 to 7% by weight of pentane as a blowing agent.

16. A process for the production of expandable styrene polymers via extrusion of a styrene polymer melt comprising blowing agent and comprising flame retardant through a die plate with attached underwater pelletizer, which comprises incorporation by mixing of a blowing agent and of, in each case based on the styrene polymer,
   a) from 0.05 to 5% by weight of an organic bromine compound whose bromine content is at least 70% by weight, as a flame retardant,
   b) from 0.05 to 2% by weight of a flame retardant synergist and
   c) from 0.1 to 5% by weight of a metal oxide or metal hydroxide of magnesium, of aluminum, or of zinc, or an alkali metal carbonate or alkali metal hydrogen carbonate, as an acid scavenger,
   into the styrene polymer melt.

\* \* \* \* \*